(12) United States Patent
Li et al.

(10) Patent No.: US 6,899,338 B2
(45) Date of Patent: May 31, 2005

(54) FERROFLUID SEAL INCORPORATING MULTIPLE TYPES OF FERROFLUID

(75) Inventors: Zhixin Li, Hudson, NH (US); Kuldip Raj, Merrimack, NH (US)

(73) Assignee: Ferrotec USA Corporation, Nashua, NH (US)

( * ) Notice: Subject to any disclaimer, the term of this patent is extended or adjusted under 35 U.S.C. 154(b) by 35 days.

(21) Appl. No.: 10/383,134

(22) Filed: Mar. 6, 2003

(65) Prior Publication Data

US 2004/0173972 A1 Sep. 9, 2004

(51) Int. Cl.[7] .............................................. F16J 15/43
(52) U.S. Cl. ........................................ 277/302; 277/410
(58) Field of Search ................................. 277/411, 410, 277/302; 384/133

(56) References Cited

U.S. PATENT DOCUMENTS

| | | | |
|---|---|---|---|
| 4,335,885 A | * 6/1982 | Heshmat | 277/347 |
| 4,407,508 A | * 10/1983 | Raj et al. | 277/302 |
| 4,407,518 A | 10/1983 | Moskowitz et al. | |
| 4,445,696 A | 5/1984 | Raj et al. | |
| 4,526,380 A | 7/1985 | Raj et al. | |
| 4,527,805 A | 7/1985 | Gowda et al. | |
| 4,630,943 A | * 12/1986 | Stahl et al. | 384/133 |
| 4,671,679 A | 6/1987 | Heshmat | |
| 4,865,334 A | 9/1989 | Raj et al. | |
| 4,894,007 A | 1/1990 | Opresko | |
| 5,092,611 A | * 3/1992 | Ehmsen et al. | 277/410 |
| 5,108,198 A | * 4/1992 | Nii et al. | 384/133 |
| 5,799,951 A | * 9/1998 | Anderson et al. | 277/301 |
| 5,826,885 A | 10/1998 | Helgeland | |
| 6,199,867 B1 | 3/2001 | Mahoney et al. | |
| 6,290,233 B1 | * 9/2001 | Yamamura et al. | 277/410 |

\* cited by examiner

Primary Examiner—Alison K. Pickard

(57) ABSTRACT

A ferrofluid seal apparatus incorporating a multi-stage ferrofluid rotary seal adapted to provide a ferrofluid pressure-type seal about a shaft element extending between a first environment and a second environment, a first magnetic fluid disposed at one stage of the multi-stage rotary seal that faces the first environment, and a second magnetic fluid disposed at another stage of the multi-stage rotary seal that faces the second environment.

22 Claims, 4 Drawing Sheets

FERROFLUID SEAL INCORPORATING MULTIPLE TYPES OF FERROFLUID

BACKGROUND OF THE INVENTION

1. Field of the Invention

The present invention relates generally to the field of ferrofluidic seals. Particularly, the present invention relates to a multi-stage ferrofluidic seal assembly. More particularly, the present invention relates to a multi-stage ferrofluidic seal assembly that incorporates more than one type of ferrofluid.

2. Description of the Prior Art

Ferrofluidic rotary seals have been widely used in vacuum applications over the past 20 years and are commonly employed to transmit rotary motion into a process chamber under high vacuum. The basic structure of the seal comprises magnets, a rotary shaft, magnetic pole pieces or poles, and a housing. The magnets, the poles, and the shaft form magnetic circuits with air gaps between the poles and the shaft. A ferrofluid is attracted to the air gap and forms the dynamic sealing between the poles and the rotary shaft. The sealing between stationary parts, such as that between a pole and its housing, is usually provided by a rubber O-ring at the radial interface.

Seals with this structure have been effective for a wide variety of applications, such as semiconductor manufacturing, optical coating, and rotary gas union, etc. However, in recent years, there are an increased number of applications that have increasingly demanding performance requirements. These requirements include, but are not limited to, ultra-high vacuum (UHV) capability, high speed, low starting/running torque, low heat generation, long life, chemical stability, and chemical compatibility.

Frequently, these requirements are contradictory to one another. For example, a ferrofluid suitable for UHV application typically has a low evaporation rate and high viscosity. It tends to have a high starting/running torque that makes it unsuitable for high-speed applications.

The properties of ferrofluids control the application for which a particular ferrofluid is suited. Ferrofluids are magnetically responsive colloidal liquids. The main constituents are nano-sized magnetic particles, one or more surfactants and a base carrier. Each particle is a permanent magnet of substantially spherical shape with a diameter of about ten nanometers. The particles are coated with a surfactant that keeps the particles separate from each other and prevents them from coalescing under the attractive Van der Waals and magnetic forces. The liquid medium is which the particles are suspended is often referred to as the carrier. In a seal grade ferrofluid, the constituents typically have the following volume fractions: magnetic particles (8%), surfactant (16%) and carrier (76%).

The magnetic properties of a ferrofluid are determined by the volume fraction of the solid component. The greater the solid amount (which is the same as the magnetization of ferrofluid), the higher the pressure holding capacity of the sealing device. By far the dominant component of the ferrofluid is the carrier. It determines the physical characteristics of a ferrofluid such as viscosity, vapor pressure, operating temperature range, volatility, thermal conductivity, and environmental compatibility, and ultimate service life and power consumption of the seal. Thus, a proper selection of ferrofluid is crucial to the successful performance of a magnetic fluid rotary seal.

Due to the strong influence of the choice of carrier on seal operation, ferrofluids are designated by their carrier type. For example, ferrofluids based on any oil in the class of perfluoropolyethers (fluorocarbons), hydrocarbons, esters, polyphenyl ethers, and silicones are called fluorocarbon, hydrocarbon, ester, polyphenyl ether, and silicone-based ferrofluids, respectively. They may all have the same colloidal sized magnetic particles but would require different surfactants with matching molecular structure of the carrier.

Current sealing applications typically utilize one of the three families of ferrofluids namely fluorocarbons, hydrocarbons or esters depending upon the environments to be sealed. All of the stages in the multi-stage seal are charged with only one type of ferrofluid. This often leads to compromising the seal performance either in regards to power consumption, environmental compatibility or life of the seal.

The ferrofluid in rotary shaft seals forms distinct O-rings with intervening air cavities. There is a change in pressure as the chamber is evacuated and back filled with process gases. For a detailed discussion see *Magnetic Fluids and Applications Handbook*, Begell House, New York, which is incorporated herein by reference. Volatility of a ferrofluid like any other liquid depends on ambient pressure. Under high vacuum (approximately $10^{-7}$ torr) a typical seal grade ferrofluid evaporates roughly twenty times faster than at atmospheric pressure (approximately 760 torr). At one torr, the volatility is about 4 times higher than at 760 torr. In general, ferrofluid life is reduced both by evaporation and by any chemical reaction with the gaseous medium. Ferrofluid stages on the vacuum side degrade much faster than those on the atmospheric side. This is due in part to exposure to high vacuum and/or in part to hazardous gases (when present), which is not experienced by the stages on the atmospheric side.

Rotary shaft seals utilizing magnetic fluids are typically designed with a sufficient safety margin in pressure holding capacity so that several of the atmospheric side stages act as reserves. They experience conditions of only ambient air consisting of mostly nitrogen (approximately 80%) and oxygen (approximately 20%) independent of the conditions that exist on the process side. Like any other liquid O-ring located inside of the seal, the first vacuum-side ferrofluid O-ring (or stage) has two free surfaces. The surface exposed to the process chamber evaporates rapidly due to prevailing high vacuum conditions. On the other hand, the second surface of the same O-ring evaporates more slowly due to the pressure of the interstage region. This pressure typically ranges from 2 to 5 psi, depending upon the seal design.

Similarly, the second vacuum-side ferrofluid O-ring also experiences different evaporation rates at its two surfaces due to different gaseous pressures in adjoining cavities. However, the evaporation of the second stage ferrofluid is much less than the first stage. The second stage is expected to last longer than the first stage. The third stage has an even longer life than the second stage. The stages on the atmospheric side have the least volatility and longest life because of the maximum pressure (760 torr or 14.7 psi) in adjoining cavities. Nonetheless, environments surrounding a ferrofluid are an additional mechanism by which the fluid seal may fail.

For instance, when a hydrocarbon-based ferrofluid is used in a seal, the atmosphere-side stages deteriorate faster (even when the volatility is low) than when an ester or a fluorocarbon-based ferrofluid is utilized. The presence of oxygen in air trapped in the interstage regions reacts with hydrocarbons and causes the fluid to congeal over time.

Under high condensable humidity, esters are not stable and thus hydrocarbons and fluorocarbons are the preferred fluids. Overall, fluorocarbon-based ferrofluids are far superior to other classes of ferrofluids in regards to environmental compatibility, long service life and ultra low vapor pressure. They are durable under radiation, humidity, reactive gases, and high temperature. Typically, fluorocarbon-based ferrofluids have a life 16 to 73 times longer than other fluids. However, the disadvantage of the fluorocarbon-based ferrofluids is that their viscosity is high. This results in greater start-up and running torque for the seal, requiring large and expensive motors to operate the device. The high viscosity also increases seal temperature, which requires liquid cooling of the device and adds to the cost of the product.

U.S. Pat. No. 4,407,518 (1983, Moskowitz et al.) discloses a nonbursting multiple-stage ferrofluid seal and system. The system includes an annular permanent magnet and annular first and second pole pieces where one end of the pole pieces defines a single-stage ferrofluid seal under one end of one pole piece and a multiple-stage ferrofluid seal under the one end of the other pole piece with the surface of the shaft element with which the seal is employed. The first and second pole pieces and the magnet define therebetween an interstage volume between the single-stage ferrofluid seal and the multiple-stage ferrofluid seal. A conduit means extends into the stage volume and connects to a means to maintain a desired pressure in the stage volume. This device uses a single, common ferrofluid throughout the seal and uses a compensating pressure to maintain seal integrity.

U.S. Pat. No. 4,865,334 (1989, Raj et al.) discloses a long-life multi-stage ferrofluid seal incorporating a ferrofluid reservoir. The reservoir is located between the seal stages and contains a quantity of ferrofluid sufficient to replace ferrofluid in the seal stages, which is lost due to evaporation or contamination. This device also uses a single type of ferrofluid but uses a reservoir system to replenish failed seals.

U.S. Pat. No. 4,335,885 (1982, Hooshang Heshmat) discloses a plural fluid magnetic/centrifugal seal to provide a hermetically sealed space between a rotated shaft member and a close fitting spaced-apart stationary housing where the housing and the shaft are shaped to provide magnetic pole-like close clearance gap regions between their opposed surfaces. A high viscosity ferromagnetic fluid normally is disposed in the magnetic gap region with the rotating shaft member at rest and at low rotational speeds. A permanent magnet or electromagnet is provided which forms a closed magnetic circuit through the magnetic gap region with the high viscosity ferromagnetic fluid. A circumferentially arranged centrifugal seal forming region is radially disposed outward from the magnetic gap region and is located between the rotatable shaft and the stationary housing member. A low viscosity centrifugal sealing fluid is disposed in the centrifugal seal forming region and is centrifugally thrown outwardly during high speed rotation of the rotating shaft member to form a centrifugal hermetic seal between the rotating shaft member and the housing at high rotational speeds of the rotating member.

Although this device uses plural fluids, the centrifugal fluid is not a ferrofluid but is comprised of water, lubricating oil, or other low viscosity fluid which does not heat up at the higher speeds of the speed range over which the seal is designed to operate. Further, the area surrounding the vane that rides in the casing where the centrifugal seal is created is nonmagnetic.

Therefore, what is needed is a multi-stage, ferrofluid seal that is capable of operation under high vacuum environments. What is also needed is a multi-stage, ferrofluid seal that is capable of overcoming the high viscosity torque required with fluorocarbon-based ferrofluid without the need for large and expensive motors. What is further needed is a multi-stage ferrofluid seal that has relatively low heat generation. What is still needed is a multi-stage, ferrofluid seal that combines the environmental compatibility and long service life characteristics of fluorocarbon-based ferrofluid seals with the low torque and low heat generation characteristics of non-fluorocarbon-based ferrofluid seals.

SUMMARY OF THE INVENTION

It is an object of the present invention to provide a multi-stage ferrofluid seal that is capable of operation under high vacuum environments. It is another object of the present invention to provide a multi-stage, ferrofluid seal that is capable of overcoming the high viscosity torque required with fluorocarbon-based ferrofluid without the need for large and expensive motors. It is a further object of the present invention to provide a multi-stage ferrofluid seal that has relatively low heat generation. It is still a further object of the present invention to provide a multi-stage, ferrofluid seal that combines the environmental compatibility and long service life characteristics of fluorocarbon-based ferrofluid seals with the low torque and low heat generation characteristics of non-fluorocarbon-based ferrofluid seals.

The present invention achieves these and other objectives by providing a multi-stage ferrofluid seal apparatus and method that utilizes a plurality of types of ferrofluids within the seal apparatus. The seal apparatus is adapted to provide a seal about a rotatable shaft element between a first high-pressure environment and a second low-pressure environment. Typically, the high-pressure environment comprises the atmosphere and the low-pressure environment comprises a vacuum chamber or system.

Usually, a ferrofluidic sealing module involves one magnet ring and two pole piece rings. Together with the shaft, the magnet ring and two pole piece rings complete a magnetic circuit. A seal may have one or more sealing modules. A larger number of sealing modules increases sealing pressure capacity. However, some variation is possible. For example, sometimes the seal can work with the shaft being nonmagnetic. In this case, the pressure capacity of the seal is greatly reduced. This type of arrangement is used as an "exclusion" seal. The seal simply provides a hermetic separation between a first environment and a second environment. In another example, the poles can be connected together with webs at the internal diameter or the outer diameter as is illustrated in U.S. Pat. Nos. 6,199,867 and 5,826,885. In such a case it is difficult to say there is one pole or multiple poles. The connecting web can be of the same material as the poles, which need to be "choked" magnetically. It can also be a welded piece of non-magnetic material. In yet another example, magnetically permeable pole pieces and magnets can be attached to the shaft (either magnetic or non-magnetic) of the seal, a housing made of magnetically permeable material is used, and ferrofluid sealing is provided between the poles and the housing. One such example can be found in U.S. Pat. No. 5,975,536. It should be pointed out that any design feature that reduces magnetic field strength in the sealing gap, such as using a single pole, magnetically bridging the poles, or using a non-magnetic shaft when the sealing gap is between the shaft and the poles, may greatly reduce the seal pressure capacity.

The multi-stage ferrofluid seal and system of the present invention includes a magnetically permeable shaft element having a plurality of separate grooves thereon, at least one annular pole piece, an annular permanent magnet, and a housing. The annular magnet is adapted to surround the shaft element together with the at least one annular pole piece of magnetically permeable material. The pole piece extends at one end into a magnetic-flux relationship with the respective poles of the annular permanent magnet. The other end extends into close, noncontacting relationship with the surface of the shaft element to be sealed defining a radial gap between the end of the pole piece and the surface of the shaft element.

The pole piece or a portion of the shaft element employed within the ferrofluid seal, or a combination of both, has a plurality of ridges and grooves beneath the pole piece to form a multiple stage (multi-stage) seal positioned toward the high-pressure environment. Ferrofluid is attracted to the radial air gap and forms dynamic sealing between the pole piece and the rotary shaft element. The arrangement of the components of the ferrofluid seal concentrates the magnetic flux and employs a plurality of grooves on the magnetically permeable shaft element to provide for a plurality of separate, spaced-apart, ferrofluid O-ring seals about the shaft element. The plurality of multiple stages under the pole piece provides a defined pressure capacity for the seal apparatus to be used to separate the high-pressure and low-pressure environments. The multi-stage pressure capacity is designed to be greater than the pressure of the process environments to provide a safety margin with respect to seal failure.

Unlike the prior art, the present invention utilizes at least two or more different types of ferrofluid. For example, under the first stage facing the vacuum environment, the ferrofluid can be a low evaporation rate, high viscosity type of ferrofluid while the ferrofluid under the stages facing the atmosphere environment can have a lower viscosity, higher oxidation resistance and relatively higher evaporation rate. Another example where chemically reactive gases are to be sealed, the ferrofluid facing the reactive gases can be specially designed to be chemically compatible and stable with the reactive gases while the ferrofluid away from the reactive gases can have better dynamic properties such as low viscosity, high magnetization and low starting torque. In yet another example, a high temperature compatible ferrofluid can be used, generally of the fluorocarbon family, on stages facing a hot process while conventional ferrofluid can be used on stages away from the process and facing the atmosphere.

Examples of the different types of ferrofluids contemplated for use in the present invention would be ferrofluids such as fluorocarbon-based ferrofluid in the stages adjacent the vacuum side. In the remaining stages, a different type of ferrofluid which could be any of the following types: ester, hydrocarbon, silicone, silahydrocarbon, chlorofluorocarbon, polyphenyl ether, etc. With different types of ferrofluids working in a single seal apparatus for different purposes, the seal apparatus can have well balanced performance to meet different or contradictory performance requirements.

Since a ferrofluid seal apparatus of the present invention has many different stages, each forming an independent magnetic fluid O-ring, it is possible to avoid mixing of different types of ferrofluid located at different stages. For example, the seal apparatus can have multiple pole pieces where each pole piece uses a different type of ferrofluid within that pole piece's radial gap. With multiple pole pieces, a large separating space between the pole pieces can be incorporated so as to avoid fluid mixing. Fluid splash guards between adjacent pole pieces can also be utilized to minimize fluid mixing.

During seal design, ferrofluids that are "friendly" towards each other can also be selected so that the adverse effects of fluid mixing is minimized in the event fluid mixing does occur.

In yet another embodiment of the present invention, the first stage of the pole piece facing the vacuum environment has one type of ferrofluid while the other stages of the same pole piece have another type of ferrofluid. A large axial gap formed by an annular groove within the pole piece between the first stage and the remaining stages may optionally be incorporated to minimize mixing of the ferrofluids between the first stage and the remaining stages. This concept can be extended to more than one stage incorporating fluorocarbon ferrofluid with the bank of stages sufficiently separated by the large axial gap. Various combinations of pole pieces and seal stages having different types of ferrofluids incorporated therein can be used to provide a seal apparatus having well balanced performance to meet different or contradictory performance requirements

DETAILED DESCRIPTION OF THE PREFERRED EMBODIMENT

Figure 1:
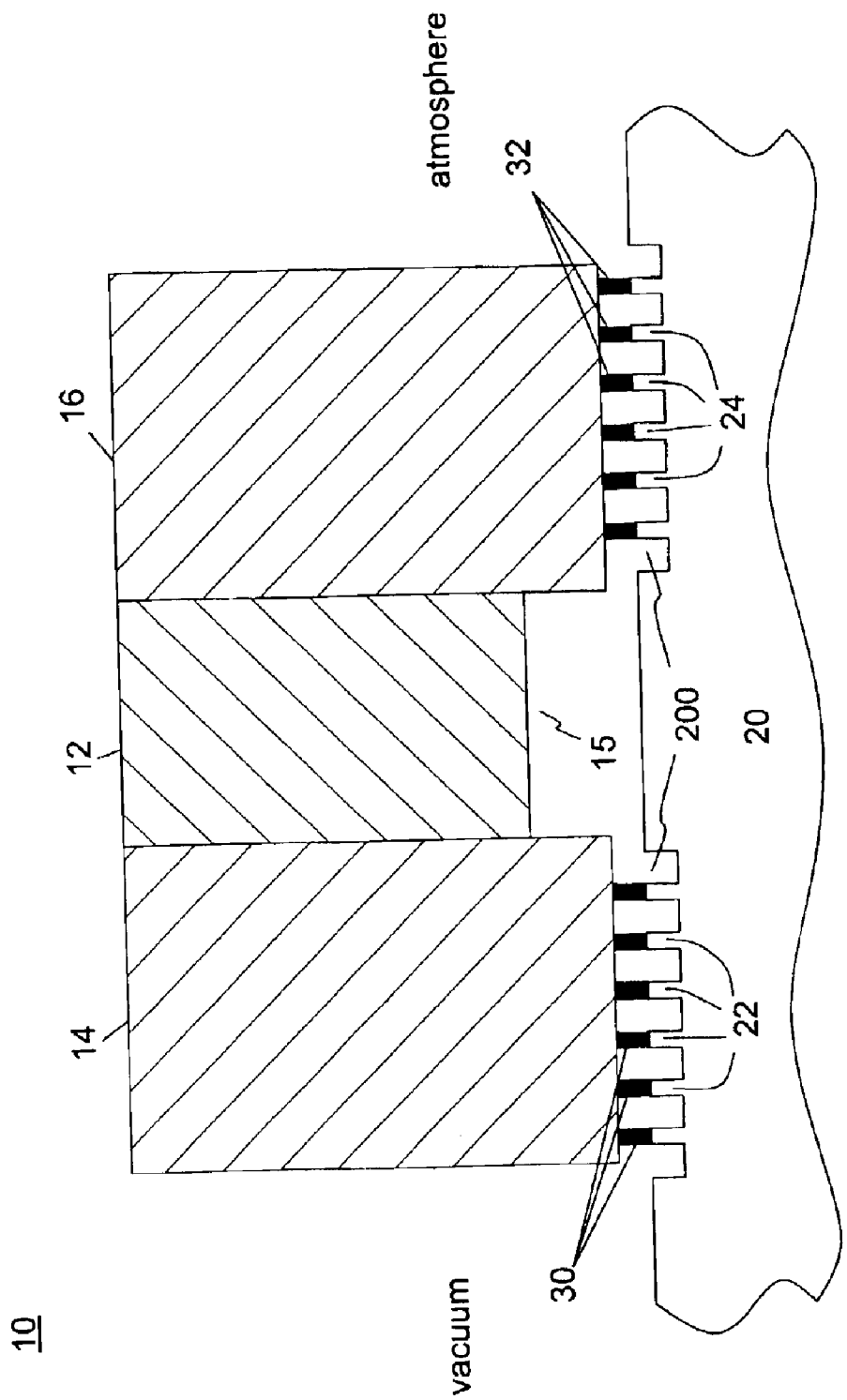
FIG. 1 is a partial, cross-sectional view of one embodiment of a ferrofluid seal of the present invention.
Figure 2:
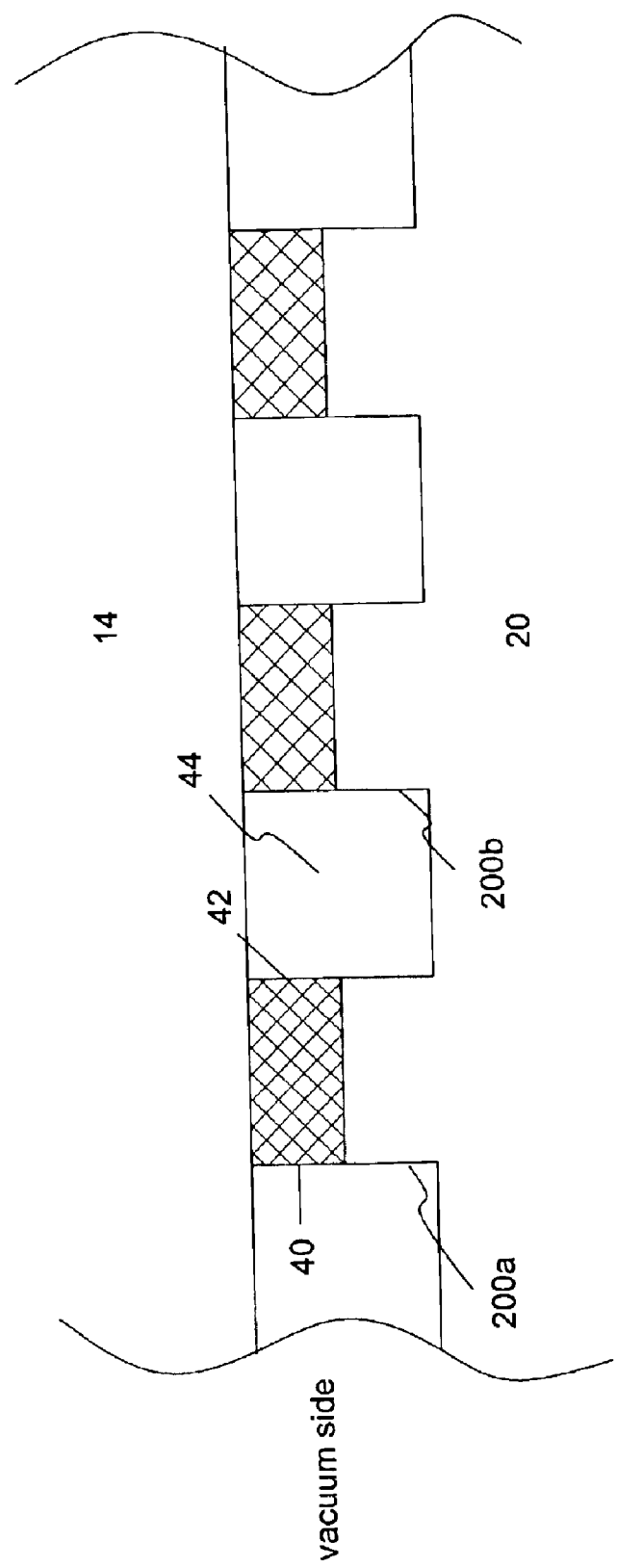
FIG. 2 is an enlarged, partial, cross-sectional view of a couple of ferrofluid stages of the present invention.
Figure 3:
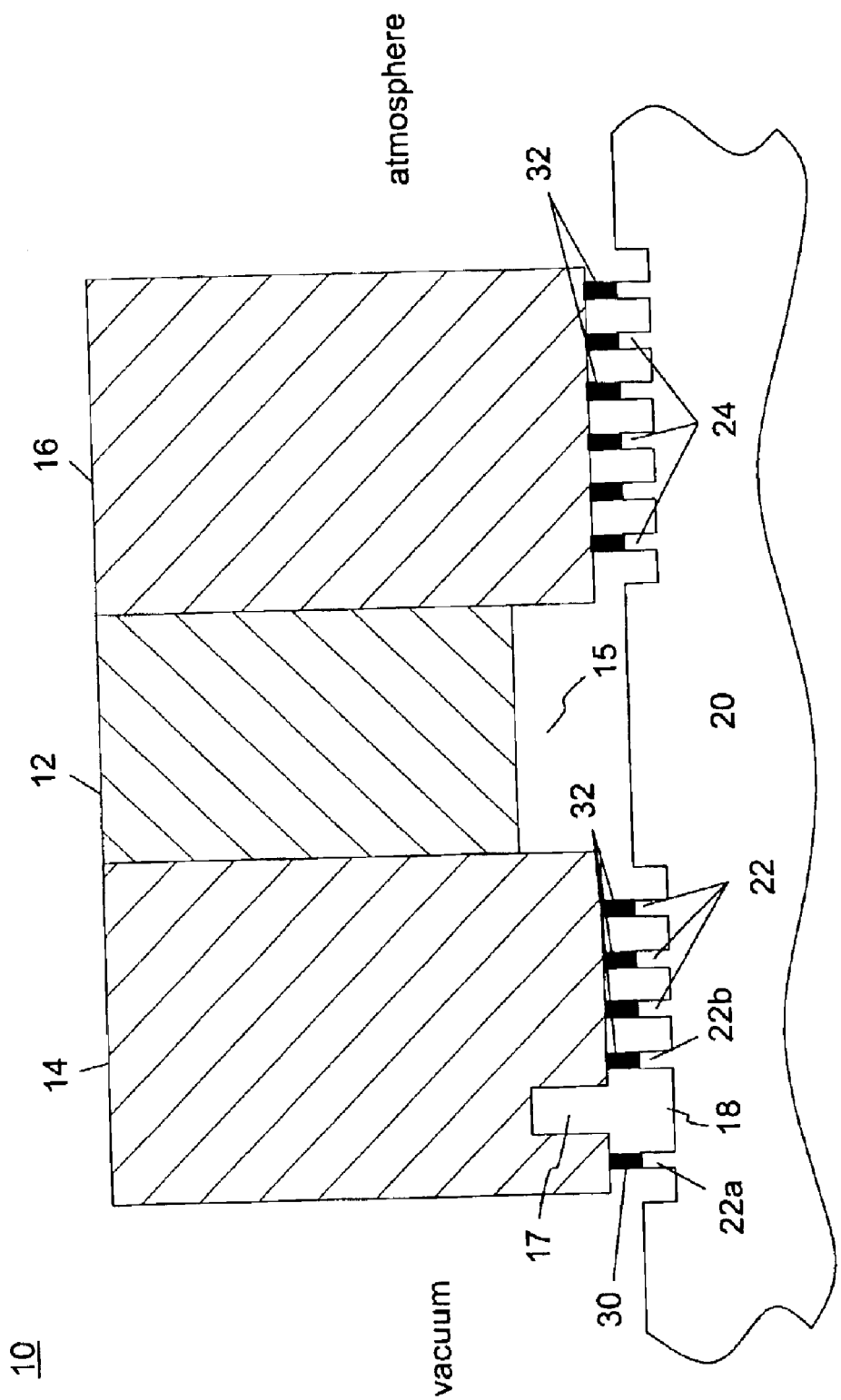
FIG. 3 is a partial, cross-sectional view of another embodiment of a ferrofluid seal of the present invention.

The preferred embodiment(s) of the present invention is illustrated in FIGS. 1–3. FIG. 1 shows a ferrofluid seal 10 typically used in a multi-stage magnetic fluid rotary seal feedthrough. Ferrofluid seal 10 has an annular permanent magnetic 12 with annular pole pieces 14 and 16 surrounding a magnetically permeable shaft 20. A plurality of edges 22 and 24 are formed on the surface of the shaft beneath the pole pieces 14 and 16. It should be noted that the plurality of edges may be formed on the inside annular surfaces of the pole pieces opposed to shaft 20. A first type of ferrofluid 30 is retained under pole piece 14 and is concentrated about the plurality of edges 22 to form a plurality of separate O-ring type ferrofluid seals or stages 200. A second type of ferrofluid 32 is retained under pole piece 16 and is concentrated about the plurality of edges 24 to form a plurality of separate O-ring type ferrofluid seals or stages. Pole pieces 14 and 16 may be designed to include a relatively large separating space 15 therebetween so as to avoid mixing of ferrofluid 30 with ferrofluid 32.

Although the above described embodiment utilizes a first type of ferrofluid 30 under pole piece 14 and a second type of ferrofluid 32 under pole piece 16, it should be understood that a multifluid arrangement may also be incorporated with a single pole piece. For instance, pole piece 14 may incorporate a different ferrofluid for each seal stage 200.

In the seal, a ferrofluid experiences different environments. There is a change in pressure as the vacuum chamber is evacuated and back filled with process gases. Volatility of a ferrofluid, like any other liquid depends on the ambient pressure. Under high vacuum (~$10^{-7}$ torr), a typical seal grade ferrofluid evaporates roughly twenty times faster than at atmospheric pressure (~760 torr). At one torr, the volatility is about four times higher than at 760 torr. Ferrofluid stages on the vacuum side degrade much faster than those on the atmosphere side due to exposure to high vacuum and also hazardous gases (when present).

The first vacuum-side stage 200a has two free surfaces like any other liquid O-ring located inside the seal. As illustrated in FIG. 2, the surface 40 exposed to the process chamber evaporates rapidly due to prevailing high vacuum conditions. The second surface 42 of the same O-ring evaporates more slowly due to the pressure in the interstage region 44, which typically ranges from 2 to 5 psi depending upon seal design. Similarly, the second vacuum stage 200b also experiences different evaporation rates at its two surfaces due to different gaseous pressures in adjoining cavities. However, evaporation of second stage 200b is much less than the evaporation of first stage 2002a and is expected to last longer than first stage 200a. The stages on the atmospheric side have the least volatility and longest life because of the maximum pressure (760 torr or 14.7 psi) in adjoining cavities.

In one example, ferrofluid 30, which faces the vacuum, can be a ferrofluid type that has a low evaporation rate and high viscosity while ferrofluid 32, which faces the atmosphere, has a lower viscosity, a higher oxidation resistance and a relatively higher evaporation rate. In another example where chemically reactive gases are to be sealed, ferrofluid 30 may be specially designed to be chemically compatible and stable with the reactive gases while ferrofluid 32 has better dynamic properties such as low viscosity, high magnetization and low starting torque. In yet another example, ferrofluid 30 may be a high temperature compatible ferrofluid when the seal faces a hot process while a conventional-type of ferrofluid is used in the stages away from the process and facing the atmosphere.

Typically, the ferrofluid types are identified by the choice of carrier used due to the carrier's strong influence on seal operation. Examples of various ferrofluid types are fluorocarbon, hydrocarbon, ester, polyphenyl ether, and silicone based ferrofluids. In a stage or stages facing the vacuum, a fluorocarbon-based ferrofluid is preferably used because they are far superior to other classes or types of ferrofluids with regard to environmental compatibility, long service life and ultra low vapor pressure. The fluorocarbon-based ferrofluid may be one disclosed by Black et al. (See Tom Black et al, *Characterization of an Ultra Low Vapor Pressure Ferrofluid*, Journal of Magnetism and Magnetic Materials, Vol. 252, pp. 39–42, 2002) with the magnetization, viscosity and vapor values of 450 Gauss, 9625 cp at 27° C. and $10^{-14}$ torr at 25° C., respectively. In general, such a fluorocarbon-based ferrofluid will have broad specifications such as 100–800 Gauss, 100–50,000 cp at 27° C. and $10^{-4}$ to $10^{-15}$ torr at 25° C. The second fluid may also have the same magnetization range, i.e. 100–800 Gauss, but viscosity of lower value such as in the range 50–1,000 cp and vapor pressure $10^{-4}$ to $10^{-10}$ torr.

Turning now to FIG. 3, there is illustrated another embodiment of the present invention. This embodiment also includes an annular permanent magnetic 12 with annular pole pieces 14 and 16 surrounding a magnetically permeable shaft 20. A plurality of edges 22 and 24 are formed on the surface of the shaft beneath the pole pieces 14 and 16. Pole piece 14 further includes an annular recess 17 between seal stages 200a and 2002b as well as a relatively larger space 18 between seal stages 200a and 200b.

The embodiment in FIG. 3 also includes a first type of ferrofluid 30 and a second type of ferrofluid 32. First type of ferrofluid 30 is disposed about seal stage 22a and faces the vacuum side. Preferably, first type of ferrofluid 30 is a fluorocarbon-based ferrofluid. The remaining seal stages 22 and 24 incorporate the second type of ferrofluid 32. The combination of the larger space 18 and the annular recess 17 helps to avoid mixing of ferrofluid 30 with ferrofluid 32. As previously mentioned, ferrofluid 30 and ferrofluid 32 may also be ferrofluids that are "friendly" towards each other so that the adverse effect of mixing ferrofluids 30 and 32 can be minimized in the event that fluid mixing does occur.

Figure 4:
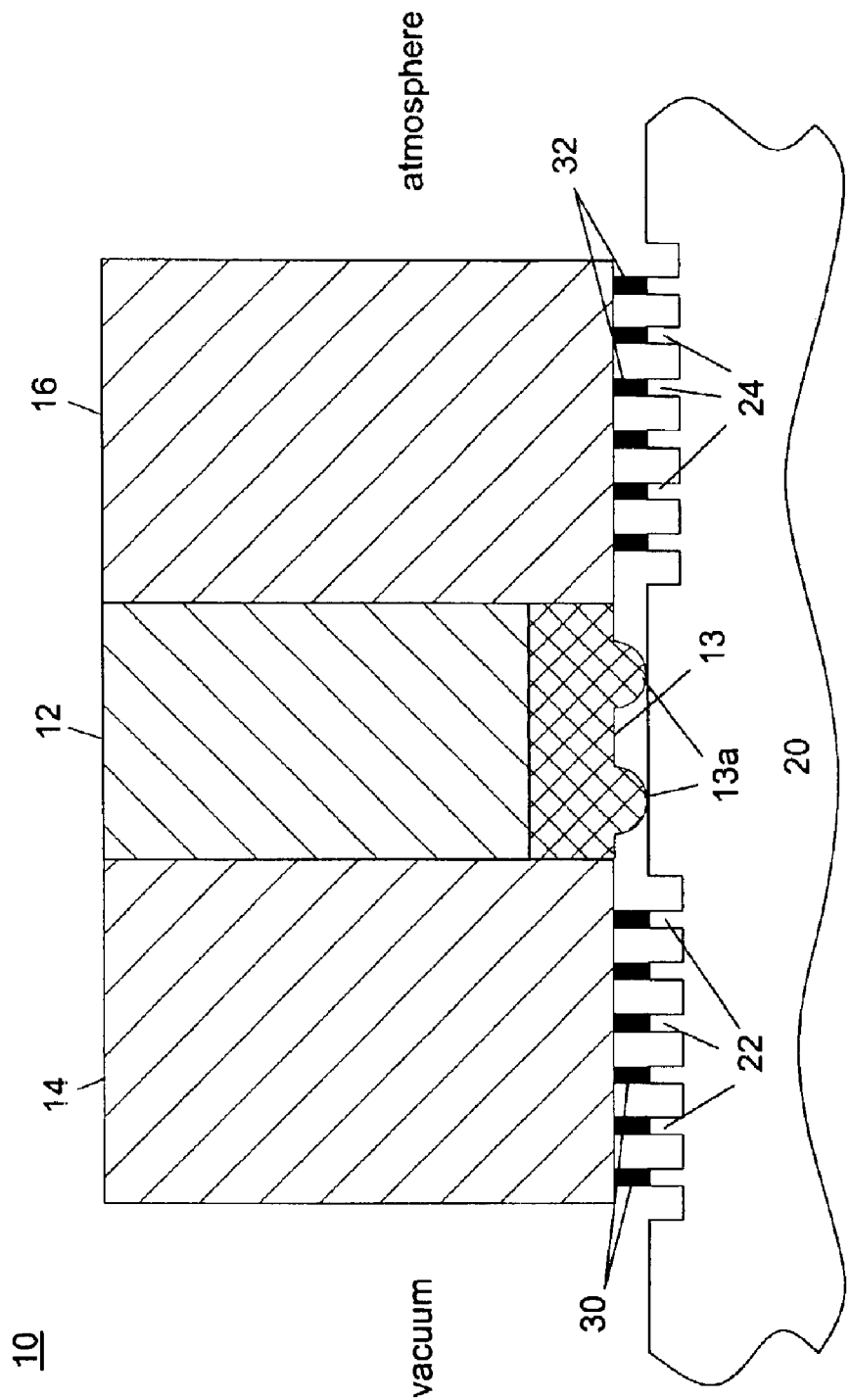
FIG. 4 is a partial, cross-sectional view of the embodiment shown in FIG. 1 showing a fluid splash guard between the annular pole pieces.

Turning now to FIG. 4, there is shown a ferrofluid seal 10 that includes an annular permanent magnet 12 with annular pole pieces 14 and 16 surrounding a magnetically permeable shaft 20. A plurality of edges 22 and 24 are formed on the surface of the shaft beneath the pole pieces 14 and 16. A first type of ferrofluid 30 is retained under pole piece 14 and is concentrated about the plurality of edges 22 to form a plurality of separate O-ring type ferrofluid seals or stages. A second type of ferrofluid 32 is retained under pole piece 16 and is concentrated about the plurality of edges 24 to form a plurality of separate O-ring type ferrofluid seals or stages.

Incorporated within a relatively large separating space 15 between pole pieces 14 and 16 is fluid splash guard 13 so as to minimize mixing of ferrofluid 30 with ferrofluid 32. Fluid splash guard 13 is a non-magnetic, annular component that is received within the annular permanent magnet 12 and includes one or more annular ribs 13a that are in sealing contact with the outside surface of shaft 20. It should be understood by those of ordinary skill in the art that splash guard 13 may be attached to shaft 20 and forming a sealing contact with the surface of separating space 15 between pole pieces 14 and 16.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A ferrofluid seal apparatus comprising:
   a multi-stage ferrofluid rotary seat adapted to provide a ferrofluid pressure-type seal about a shaft element extending between a first environment and a second environment;
   a first magnetic fluid disposed at one stage of said multi-stages ferrofluid rotary seal; and
   a second magnetic fluid disposed at another stage of said multi-stage ferrofluid rotary seal wherein said first magnetic fluid and said second magnetic fluid are separated by an air gap to prevent mixing.

2. The apparatus of claim 1 wherein said first magnetic fluid and said second magnetic fluid are formulated to minimize any adverse effects arising from inadvertent mixing of said first magnetic fluid with said second magnetic fluid.

3. The apparatus of claim 1 wherein said multi-stage ferrofluid rotary seal further includes an enlarged annular space between said one stage with said first magnetic fluid and said other stage with said second magnetic fluid wherein said enlarged annular space is larger than the annular space between stages with the same magnetic fluid.

4. The apparatus of claim 1 wherein said multi-stage ferrofluid rotary seal further includes a plurality of pole pieces wherein at least one of said pole pieces has at least two different magnetic fluids associated therewith.

5. The apparatus of claim 1 wherein said multi-stage ferrofluid rotary seal further includes a plurality of pole pieces wherein each pole piece has a different magnetic fluid associated therewith.

6. The apparatus of claim 1 wherein said first magnetic fluid and said second magnetic fluid are different from each other but are selected from the group of ferrofluid types consisting of fluorocarbon, ester, hydrocarbon, silicone, silahydrocarbon, chlorofluorocarbon, and polyphenyl ether.

7. A ferrofluid seal apparatus adapted to provide a ferrofluid pressure-type seal about a shaft extending between a first environment and a second environment, said seal apparatus comprising:
  an annular permanent magnet adapted to surround said shaft to be sealed;
  a magnetically permeable pole piece having a one and another end, said one end of said pole piece in a magnetic-flux relationship with said magnet and said another end of said pole piece adapted to extend into a close, noncontacting relationship with said shaft defining a radial gap, said another end forming a plurality of separate stages in said radial gap;
  a first ferrofluid disposed at at least one stage of said plurality of separate stages; and
  a second ferrofluid disposed at at least another stage of said plurality of separate stages wherein said first ferrofluid and said second ferrofluid are separated by an air gap to prevent mixing.

8. The seal apparatus of claim 7 said first ferrofluid and said second ferrofluid are formulated to minimize any adverse effects arising from inadvertent mixing of said first ferrofluid with said second ferrofluid.

9. The seal apparatus of claim 7 wherein said plurality of separate stages further includes an enlarged annular space between said one stage with said first ferrofluid and said another stage with said second ferrofluid wherein said enlarged annular is larger than the annular space between fluid stages with the same magnetic fluid.

10. The seal apparatus of claim 7 further comprising a plurality of magnetically permeable pole pieces wherein at least one of said pole pieces has at least two different ferrofluids associated therewith.

11. The seal apparatus of claim 7 further comprising a plurality of magnetically permeable pole pieces wherein each pots piece has a different ferrofluid associated therewith.

12. The seal apparatus of claim 7 wherein said first ferrofluid and said second ferrofluid are different from each other but are selected from the group of ferrofluid types consisting of fluorocarbon, ester, hydrocarbon, silicone, silahydrocarbon, chlorofluorocarbon, and polyphenyl ether.

13. A ferrofluid seal apparatus comprising:
  a multi-stage ferrofluid rotary seal means for sealing about a shaft means extending between a first environment and a second environment,
  a first magnetic fluid means disposed at one stage of said multi-stage ferrofluid rotary seal means for creating a first liquid seal between said rotary seal means and said shaft means; and
  a second magnetic fluid means disposed at another stage of said multi-stage ferrofluid rotary seal means for creating a second liquid seal between said rotary seal means and said shaft means wherein said first magnetic fluid means and said second magnetic fluid means are separated by an air gap to prevent mixing.

14. The seal apparatus of claim 13 wherein said first magnetic fluid means and said second magnetic fluid means are formulated to minimize any adverse effects arising from inadvertent mixing of said first magnetic fluid means with said second magnetic fluid means.

15. The seal apparatus of claim 13 wherein said multi-stage ferrofluid rotary seal means further includes an enlarged annular means between said one stage with said first magnetic fluid means and said other stage with said second magnetic fluid means wherein said enlarged annular means is larger than the annular means between fluid stages with the same magnetic fluid means.

16. The seal apparatus of claim 13 wherein said multi-stage ferrofluid rotary seal means further includes a plurality of pole means wherein each pole means has a different magnetic fluid means associated therewith.

17. The seal apparatus of claim 13 wherein said multi-stage ferrofluid rotary seal means further includes a plurality of pole means wherein at least one pole means has at least two different magnetic fluid means associated therewith.

18. The seal apparatus of claim 13 wherein said first magnetic fluid means and said second magnetic fluid means are different from each other but are selected from the group of ferrofluid types consisting of fluorocarbon, ester, hydrocarbon, silicone, silahydrocarbon, chlorofluorocarbon, and polyphenyl ether.

19. A method of providing a ferrofluid rotary seal having an improved performance characteristic, said method comprising:
  providing a ferrofluid seal apparatus about a shaft element extending between a first environment and a second environment, said seal apparatus having a multi-stage ferrofluid seal wherein said multi-stage ferrofluid seal is in a close noncontacting relationship with said shaft element defining a radial gap;
  providing a first ferrofluid disposed at one stage of said multi-stage ferrofluid seal; and
  providing a second ferrofluid disposed at another stage of said multi-stage ferrofluid seal wherein said first ferrofluid and said second ferrofluid are separated by an air gap to prevent mixing.

20. The method of claim 19 further providing an enlarged annular space between said one stage with said first ferrofluid and said other stage with said second ferrofluid wherein said enlarged annular space is larger than the annular space between stages with the same ferrofluid.

21. In a ferrofluid magnetic sealing method, which method comprises forming a multi-stage ferrofluid seal about a rotary shaft element extending between a first environment and a second environment, the improvement comprising:
  disposing a first magnetic fluid at at least one stage of said multi-stage ferrofluid seal; and
  disposing a second magnetic fluid at at least another stage of said multi-stage ferrofluid seal wherein said first magnetic fluid and said second magnetic fluid are separated by an air gap to prevent mixing.

22. The method of claim 21 further comprising providing an annular space between said one stage with said first magnetic fluid and said another stage with said second magnetic fluid wherein said annular space is larger than the annular space between adjacent stages having the same magnetic fluid.

* * * * *